United States Patent
Bag et al.

(10) Patent No.: US 10,892,908 B2
(45) Date of Patent: Jan. 12, 2021

(54) MANAGING COMMUNICATION BETWEEN GATEWAY AND BUILDING AUTOMATION DEVICE BY INSTALLING PROTOCOL SOFTWARE IN GATEWAY

(71) Applicant: ABB AG, Mannheim (DE)

(72) Inventors: Gargi Bag, Vaesteras (SE); Zhibo Pang, Vaesteras (SE); Morgan Johansson, Vaesteras (SE)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 15/983,131

(22) PCT Filed: Nov. 20, 2015

(86) PCT No.: PCT/EP2015/077244
§ 371 (c)(1),
(2) Date: May 18, 2018

(87) PCT Pub. No.: WO2017/084719
PCT Pub. Date: May 26, 2017

(65) Prior Publication Data
US 2018/0331843 A1 Nov. 15, 2018

(51) Int. Cl.
*H04L 12/28* (2006.01)
*H04W 4/70* (2018.01)
(Continued)

(52) U.S. Cl.
CPC .......... *H04L 12/2814* (2013.01); *H04L 12/28* (2013.01); *H04L 12/4625* (2013.01);
(Continued)

(58) Field of Classification Search
CPC . H04L 12/2814; H04L 67/34; H04L 12/4625; H04L 69/18; H04L 41/022;
(Continued)

(56) References Cited

U.S. PATENT DOCUMENTS 6,192,282 B1 * 2/2001 Smith .................... G05B 15/02
340/12.53
6,208,952 B1 * 3/2001 Goertzel ................. H04L 29/06
709/228

(Continued)

FOREIGN PATENT DOCUMENTS

WO    WO 2011035438 A1    3/2011

*Primary Examiner* — Jay P Patel
(74) *Attorney, Agent, or Firm* — Leydig, Voit & Mayer, Ltd.

(57) ABSTRACT

A method for managing communication with a building automation device, the method being performed in a gateway, includes the steps of: receiving a packet from the building automation device; determining that the gateway currently fails to support a communication protocol being compatible with the packet; transmitting the packet to a protocol server; receiving, from the protocol server, executable software instructions to be used for communication over the communication protocol being compatible with the packet; and installing the executable software instructions to provide a capability to communicate over the communication protocol being compatible with the packet.

18 Claims, 2 Drawing Sheets

(51) Int. Cl.
*H04L 29/08* (2006.01)
*H04L 29/06* (2006.01)
*H04L 12/46* (2006.01)
*H04L 12/24* (2006.01)
*H04L 29/14* (2006.01)
*H04W 4/80* (2018.01)

(52) U.S. Cl.
CPC ............ *H04L 41/022* (2013.01); *H04L 67/34* (2013.01); *H04L 69/18* (2013.01); *H04L 69/40* (2013.01); *H04W 4/70* (2018.02); *H04W 4/80* (2018.02)

(58) Field of Classification Search
CPC .......... H04L 12/28; H04L 69/40; H04W 4/70; H04W 4/80
See application file for complete search history.

(56) References Cited

U.S. PATENT DOCUMENTS

| | | | |
|---|---|---|---|
| 8,219,660 B2 | 7/2012 | McCoy et al. | |
| 8,560,634 B2* | 10/2013 | Twitchell, Jr. | H04W 4/206 709/217 |
| 8,613,062 B2* | 12/2013 | Chai | H04L 41/024 726/6 |
| 9,252,967 B2* | 2/2016 | Li | H04L 12/2809 |
| 10,425,244 B2* | 9/2019 | Rao | G06Q 30/0276 |
| 10,523,689 B2* | 12/2019 | Decenzo | H04L 63/1408 |
| 2002/0016639 A1* | 2/2002 | Smith | G05B 15/02 700/9 |
| 2003/0227643 A1* | 12/2003 | Reddy | H04L 12/5692 358/1.13 |
| 2004/0052252 A1* | 3/2004 | Karaoguz | G01S 5/0252 370/389 |
| 2005/0120122 A1* | 6/2005 | Farnham | H04L 69/03 709/230 |
| 2006/0007915 A1* | 1/2006 | Frame | H04M 7/0057 370/352 |
| 2006/0248208 A1* | 11/2006 | Walbeck | H04L 29/06 709/230 |
| 2007/0043476 A1 | 2/2007 | Richards et al. | |
| 2007/0130210 A1* | 6/2007 | Park | H04L 29/06027 |
| 2007/0195870 A1* | 8/2007 | Lewis | H04W 40/30 375/219 |
| 2011/0213867 A1* | 9/2011 | McCoy | H04L 69/18 709/223 |
| 2012/0098446 A1* | 4/2012 | Kim | H05B 37/0272 315/193 |
| 2013/0159550 A1* | 6/2013 | Vasseur | H04W 40/248 709/242 |
| 2013/0218347 A1* | 8/2013 | Jung | G06Q 30/02 700/275 |
| 2014/0074994 A1 | 3/2014 | Honda et al. | |
| 2014/0269762 A1 | 9/2014 | Voit et al. | |
| 2014/0317303 A1* | 10/2014 | Toprani | G06F 9/445 709/227 |
| 2014/0370817 A1* | 12/2014 | Luna | H04W 8/005 455/41.3 |
| 2014/0370818 A1* | 12/2014 | Luna | H04W 8/005 455/41.3 |
| 2015/0180503 A1* | 6/2015 | Schubert | H03M 3/46 341/143 |
| 2015/0222517 A1* | 8/2015 | McLaughlin | H04W 4/70 713/156 |
| 2016/0080502 A1* | 3/2016 | Yadav | G06F 16/285 709/227 |
| 2017/0019144 A1* | 1/2017 | Malach | H04W 4/80 |
| 2019/0138704 A1* | 5/2019 | Shrivastava | G10L 15/22 |
| 2020/0253025 A1* | 8/2020 | Weber | H04L 12/6418 |

* cited by examiner

MANAGING COMMUNICATION BETWEEN GATEWAY AND BUILDING AUTOMATION DEVICE BY INSTALLING PROTOCOL SOFTWARE IN GATEWAY

CROSS-REFERENCE TO PRIOR APPLICATION

This application is a U.S. National Phase Entry under 35 U.S.C. § 371 of International Patent Application No. PCT/EP2015/077244, filed on Nov. 20, 2015, the entire disclosure of which is hereby incorporated by reference herein.

FIELD

The invention relates to a method, a gateway, a computer program and a computer program product for managing communication between a building automation device and a gateway by installing protocol software in gateway.

BACKGROUND

Building Automation (BA) is an area where communication technology is used to influence how a building is managed. Building automation can be used both for data retrieval using sensors, and for affecting building systems using actuators. A control unit can use input from the sensors and thereby influence various aspects of the building using the actuators. The sensors can e.g. be temperature sensors, humidity sensors, door/window opening sensors, cameras, IR detectors, etc. Actuators can e.g. be used to control heating, ventilation, air conditioning (HVAC), alarms, door openers, etc. Sensors and actuators are collectively denoted building automation devices.

Each building automation device can be quite small and may be restricted in terms of communication capabilities, memory, processing capabilities, energy usage, etc.

Recently, wireless technology has been introduced in the field of building automation. The building automation devices can then communicate with a gateway, which in turn is in communication with a local and/or remote control device. However, since there are so many different wireless communication protocols, it gets very complicated to support all wireless communication protocols, or at least a wireless common communication protocol which can be used for communication between the gateway and the building automation device. Moreover, different building automation devices typically originate from different manufacturers and these may thus support different communication protocols, further complicating the compatibility problems.

U.S. Pat. No. 8,219,660 presents a building automation system (BAS) network manager supporting a plurality of device protocols coupled to at least one communication network, and a plurality of logical connections to individual BAS networks to multiple end devices of a BAS. The BAS network manager can communicate with each of the end devices regardless of the protocol or protocol version of the BAS network by implementing a protocol stack above the link layer for each protocol or protocol version, providing an integrated multi-BAS network interface, and maintaining a device identifier for each BAS network the network manager is coupled to in the protocol stack. However, it is impossible for the network manager to support all current and future protocols, whereby time-consuming and expensive maintenance is required over time to keep the network manager up to date.

SUMMARY

In an embodiment, the present invention provides a method for managing communication with a building automation device, the method being performed in a gateway and comprising the steps of: receiving a packet from the building automation device; determining that the gateway currently fails to support a communication protocol being compatible with the packet; transmitting the packet to a protocol server; receiving, from the protocol server, executable software instructions configured for communication over the communication protocol being compatible with the packet; and installing the executable software instructions to provide a capability to communicate over the communication protocol being compatible with the packet.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
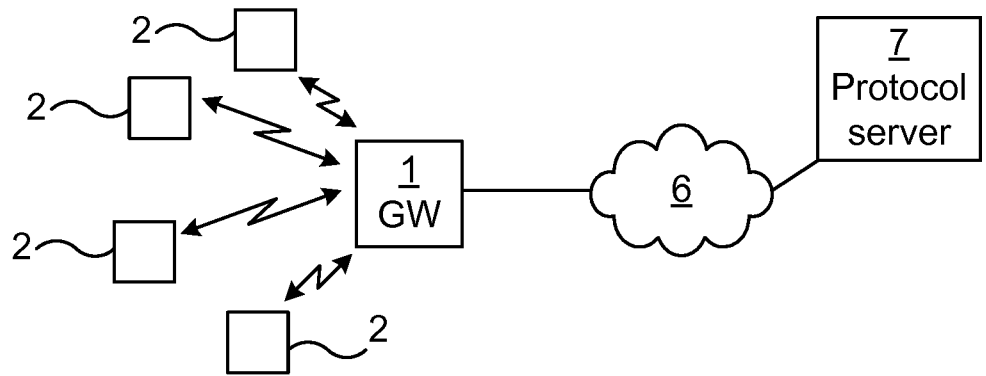
FIG. 1 is a schematic diagram illustrating an environment in which embodiments presented herein can be applied.

According to a first aspect it is provided a method for managing communication with a building automation device. The method is performed in a gateway and comprises the steps of: receiving a packet from the building automation device; determining that the gateway currently fails to support a communication protocol being compatible with the packet; transmitting the packet to a protocol server; receiving, from the protocol server, executable software instructions to be used for communication over a communication protocol being compatible with the packet; and installing the executable software instructions to provide a capability to communicate over the communication protocol being compatible with the packet.

The method may further comprise the step of: establishing communication with the building automation device over the communication protocol being compatible with the packet.

The communication protocol may be a media access control, MAC, level protocol.

The communication protocol may be selected from the group consisting of 6LOWPAN, IPv6 over Low power Wireless Personal Area Networks, IEEE 802.15.4, ZigBee, Thread, Bluetooth, Bluetooth Low Energy, Digital Enhanced Cordless Telecommunications Ultra Low Energy, DECT ULE, and EnOcean.

The step of receiving may comprise demodulating the packet and performing analogue to digital conversion.

According to a second aspect it is provided a gateway for managing communication with a building automation device. The gateway comprises: a processor; and a memory storing instructions that, when executed by the processor, cause the gateway to: receive a packet from the building automation device; determine that the gateway currently fails to support a communication protocol being compatible with the packet; transmit the packet to a protocol server; receive, from the protocol server, executable software instructions to be used for communication over a communication protocol being compatible with the packet; and install the executable software instructions to provide a capability to communicate over the communication protocol being compatible with the packet.

The gateway may further comprise instructions that, when executed by the processor, cause the gateway to: establish communication with the building automation device over the communication protocol being compatible with the packet. The communication protocol may be a media access control, MAC, level protocol.

The communication protocol may be selected from the group consisting of 6LOWPAN, IPv6 over Low power Wireless Personal Area Networks, IEEE 802.15.4, ZigBee, Thread, Bluetooth, Bluetooth Low Energy, Digital Enhanced Cordless Telecommunications Ultra Low Energy, DECT ULE, and EnOcean.

The instructions to receive may comprise instructions that, when executed by the processor, cause the gateway to demodulate the packet and perform analogue to digital conversion.

According to a third aspect it is provided a computer program for managing communication with a building automation device. The computer program comprises computer program code which, when run on a gateway causes the gateway to: receive a packet from the building automation device; determine that the gateway currently fails to support a communication protocol being compatible with the packet; transmit the packet to a protocol server; receive, from the protocol server, executable software instructions to be used for communication over a communication protocol being compatible with the packet; and install the executable software instructions to provide a capability to communicate over the communication protocol being compatible with the packet.

According to a fourth aspect it is provided a computer program product comprising a computer program according to the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

FIG. 1 is a schematic diagram illustrating an environment in which embodiments presented herein can be applied. A gateway 1 is capable of wireless communication, at least on a physical layer initially, with a plurality of building automation devices 2, e.g. being sensors and/or actuators, used for building automation. It is to be noted that the gateway 1 can optionally support several physical layers. Examples of sensors are temperature sensors, humidity sensors, door/window opening sensors, cameras, IR detectors, etc. Actuators can e.g. be used to control heating, ventilation, air conditioning (HVAC), alarms, door openers, etc. Each building automation device 2 can be quite small and may be restricted in terms of communication capabilities, power consumption and/or processing power.

The gateway 1 provides connectivity for the building automation devices 2 to a network 6, such as a local area network (LAN) and/or the Internet, whereby each building automation device 2 can communicate with a protocol server 7. The network 6 can e.g. be based on Internet Protocol (IP) for its communication and can be any combination of wire-based communication (e.g. Ethernet) and wireless communication (e.g. any of the IEEE 802.11 standards, cellular networks, etc.). The protocol server 7 is used to provide support for protocols in the gateway 1 on demand. The protocol server 7 can be implemented using any suitable server computer being capable of communicating with the gateway 1 using the network 6 and perform the functions described with reference to FIG. 2 below.

The inventors have realised that the gateway 1 can request installation of new communication protocols on demand, when an unrecognised packet is received from a building automation device. As described in more detail below, the gateway then forwards the packet to the protocol server 7 which provides the required software for the protocol to the gateway. In this way, the gateway 1 can be provided without the need to support all possible communication protocols when deployed, which greatly simplifies installation and reduces compatibility issues between gateway 1 and building automation devices 2. Moreover, as new building automation devices 2 are deployed with potentially new protocols, the gateway 1 is upgraded with help from the protocol server 7 without any need for operator involvement.

Figure 2:
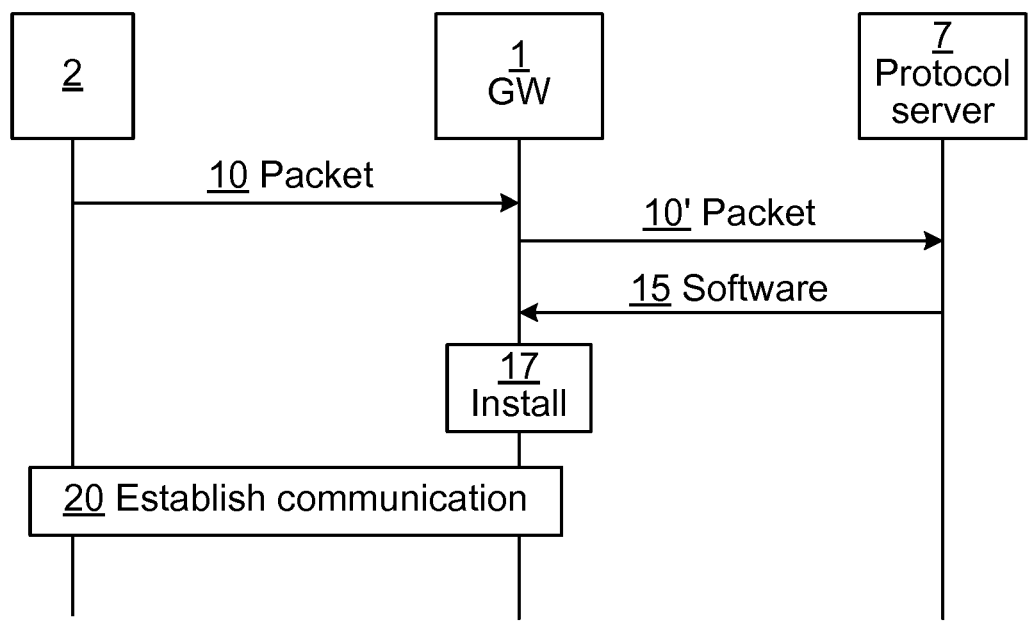
FIG. 2 is a sequence diagram illustrating the communication flow between the building automation device, the gateway and the protocol server of FIG. 1.

FIG. 2 is a sequence diagram illustrating the communication flow between the gateway 1 and a building automation device 2 of FIG. 1.

The building automation device 2 sends a packet 10 to the gateway 1. The packet is a communication packet. The gateway 1 recognises that it does not support any communication protocol which is compatible with the packet 10 and forwards the packet 10' to the protocol server 7.

The protocol server 7 analyses the packet 10' and determines a communication protocol which is compatible with the packet 10'. This analysis is based on the content of the packet. Once the communication protocol is determined, the protocol server 7 retrieves executable software instructions which can be executed by the gateway to support the protocol. The executable software instructions are from memory, which can be local memory or remote memory.

The protocol server 7 subsequently transmits the executable software instructions 15 to the gateway 1 and the gateway installs 17 the executable software instructions 15.

The gateway 1 is thus provided with support for the protocol of the packet. Hence, the gateway and the building automation device 2 can then establish communication 18 using the protocol.

Figure 3:
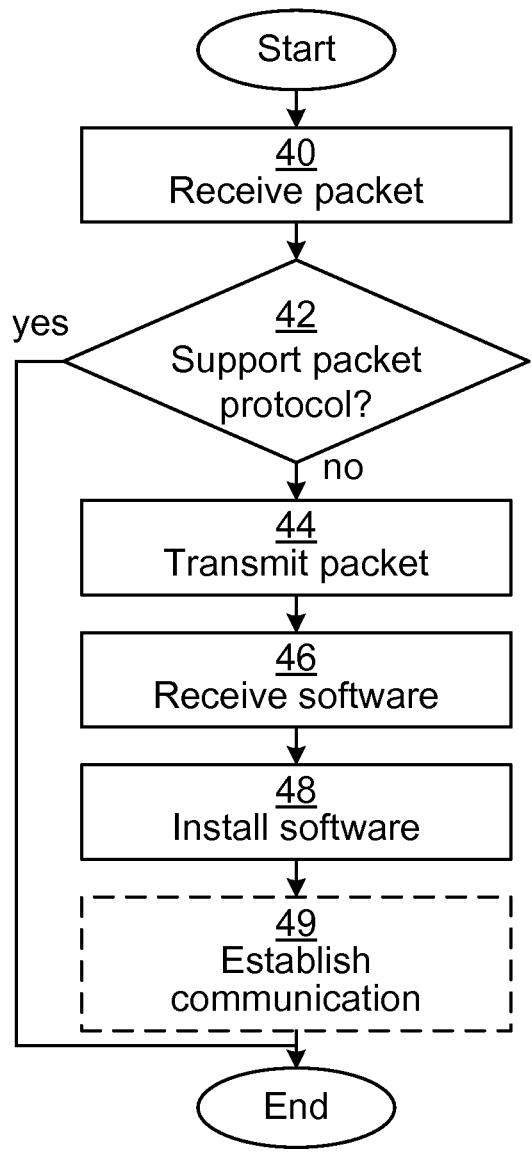
FIG. 3 is a flow chart managing communication with a building automation device, performed in the gateway of FIG. 1 according to one embodiment.

FIG. 3 is a flow chart managing communication with a building automation device, performed in the gateway of FIG. 1 according to one embodiment. The flow chart roughly corresponds to the activities of the gateway 1 shown in FIG. 2 and described above.

In a receive packet step 40, a packet is received from the building automation device. Optionally, this step comprises demodulating the packet and performing analogue to digital conversion. The gateway is capable of receiving the radio signal carrying the packet. The gateway can thus support a physical layer protocol of a signal containing the packet.

In a conditional support packet protocol step 42, the gateway determines whether it currently supports or fails to support a communication protocol being compatible with the packet. This determination is performed based on an inspection of the packet, either in digital form or in analogue form. When no communication protocol being compatible with the packet is supported, the method proceeds to a transmit packet step 44. Otherwise, the method ends.

In the transmit packet step 44, the packet is transmitted to the protocol server. The purpose of this transmission is for the protocol server to find suitable executable software instructions which can be installed in the server to support the communication protocol of the packet. Optionally, the transmission contains an indication of the request for protocol support.

In a receive software step 46, executable software instructions are received from the protocol server. The executable software instructions are meant to be used for communication over a communication protocol being compatible with the packet.

In an install software step 48, the executable software instructions are installed in the gateway, in order to provide a capability to communicate over the communication protocol being compatible with the packet. The executable software instructions can be in the form of a plugin (also known as add-on), which allows installation during runtime. In such a case, the gateway 1 does not need to be restarted to support the communication protocol.

In an optional establish communication step 49, communication is established with the building automation device over the communication protocol being compatible with the packet.

The communication protocol can be a media access control (MAC) level protocol. For instance, the communication protocol can be selected from the group consisting of 6LOWPAN, IEEE 802.15.4, ZigBee, Thread, Bluetooth, Bluetooth Low Energy, Digital Enhanced Cordless Telecommunications Ultra Low Energy (DECT ULE) and EnOcean.

Figure 4:
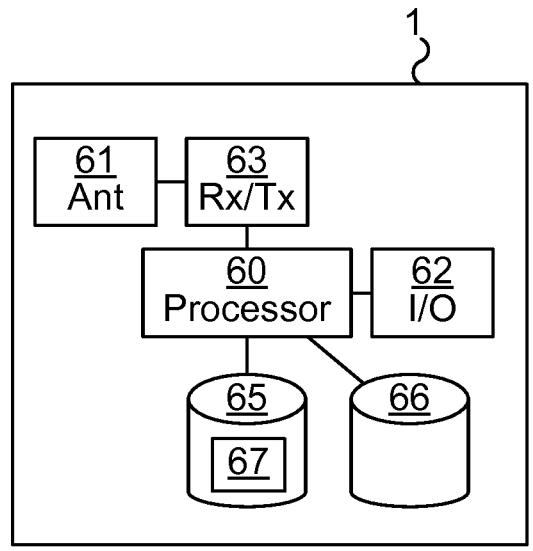
FIG. 4 is a schematic diagram showing some components of the gateway of FIG. 1 according to one embodiment.

Using this method, the gateway can be provided with only minimal or even no support for communication with building automation devices. Support for appropriate protocols are then added as needed when building automation devices start to communicate, without the need for any operator involvement. The gateway is also provided with a way to adapt its protocol support when protocols change and install new versions of existing protocols as needed. FIG. 4 is a schematic diagram showing some components of the gateway 1 of FIG. 1 according to one embodiment. A processor 60 is provided using any combination of one or more of a suitable central processing unit (CPU), multiprocessor, microcontroller, digital signal processor (DSP), application specific integrated circuit etc., capable of executing software instructions 67 stored in a memory 65, which can thus be a computer program product. The processor 60 can be configured to execute the method described with reference to FIG. 4.

The memory 65 can be any combination of read and write memory (RAM) and read only memory (ROM). The memory 65 also comprises persistent storage, which, for example, can be any single one or combination of magnetic memory, optical memory, solid state memory or even remotely mounted memory.

A data memory 66 is also provided for reading and/or storing data during execution of software instructions in the processor 60. The data memory 66 can be any combination of read and write memory (RAM) and read only memory (ROM).

The gateway 1 further comprises an I/O interface 62 for communicating with other external entities, such as the protocol server (via wireless and/or wired communication paths). Optionally, the I/O interface 62 also includes a user interface.

The gateway 1 also comprises one or more transceivers 63, comprising analogue and digital components, and a suitable number of antennas 61 for wireless communication with a building automation devices. Executable software instructions (see 15 of FIG. 2) can be installed in the gateway 1 to thereby provide support for an additional communication protocol. These executable software instructions can be firmware, e.g. provided in the transceiver 63 and/or as part of the executable software instructions 67 in the memory 65.

Other components of the gateway 1 are omitted in order not to obscure the concepts presented herein.

Figure 5:
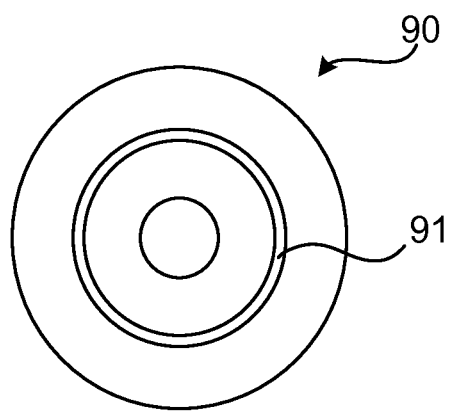
FIG. 5 shows one example of a computer program product comprising computer readable means.

FIG. 5 shows one example of a computer program product comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 65 of FIG. 4. While the computer program 91 is here schematically shown as a track on the depicted optical disk, the computer program can be stored in any way which is suitable for the computer program product, such as a removable solid state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for managing communication between a building automation device and a network using a gateway disposed between the building automation device and the network and comprising the steps of:
   receiving, in the gateway, a packet from the building automation device;
   determining that the gateway currently fails to support a communication protocol being compatible with the packet;
   transmitting the packet from the gateway to a protocol server;
   receiving in the gateway, from the protocol server, executable software instructions configured for communication over the communication protocol being compatible with the packet; and
   installing the executable software instructions in the gateway to provide a capability to communicate over the communication protocol being compatible with the packet.

2. The method according to claim 1, further comprising the step of:
   establishing communication between the gateway and the building automation device over the communication protocol being compatible with the packet.

3. The method according to claim 1, wherein the communication protocol is a media access control, MAC, level protocol.

4. The method according to claim 1, wherein the communication protocol is selected from the group consisting of 6LOWPAN, IPv6 over Low power Wireless Personal Area Networks, IEEE 802.15.4, ZigBee, Thread, Bluetooth, Bluetooth Low Energy, Digital Enhanced Cordless Telecommunications Ultra Low Energy, DECT ULE, and EnOcean.

5. The method according to claim 1, wherein the step of receiving comprises demodulating the packet and performing analogue to digital conversion.

6. A gateway for managing communication between a building automation device and a network, the gateway being disposed between the building automation device and the network comprising:
   a processor; and
   a memory storing instructions that, when executed by the processor, are configured to cause the gateway to:
      receive a packet from the building automation device;
      determine that the gateway currently fails to support a communication protocol being compatible with the packet;
      transmit the packet to a protocol server;
      receive, from the protocol server, executable software instructions to be used for communication over the communication protocol being compatible with the packet; and
      install the executable software instructions to provide a capability to communicate over the communication protocol being compatible with the packet.

7. The gateway according to claim 6, further comprising instructions that, when executed by the processor, are configured cause the gateway to:
   establish communication with the building automation device over the communication protocol being compatible with the packet.

8. The gateway according to claim 6, wherein the communication protocol comprises a media access control (MAC) level protocol.

9. The gateway according to claim 6, wherein the communication protocol is selected from the group consisting of 6LOWPAN, IPv6 over Low power Wireless Personal Area Networks, IEEE 802.15.4, ZigBee, Thread, Bluetooth, Bluetooth Low Energy, Digital Enhanced Cordless Telecommunications Ultra Low Energy, DECT ULE, and EnOcean.

10. The gateway according to claim 6, wherein the instructions to receive comprise instructions that, when executed by the processor, are configured to cause the gateway to demodulate the packet and perform analogue to digital conversion.

11. A non-transitory computer readable medium comprising computer program code for managing communication between a building automation device and a network, the computer program code, when run on a gateway disposed between the building automation device and the network and being configured to cause the gateway to:
   receive a packet from the building automation device;
   determine that the gateway currently fails to support a communication protocol being compatible with the packet;
   transmit the packet to a protocol server;
   receive, from the protocol server, executable software instructions configured for communication over the communication protocol being compatible with the packet; and
   install the executable software instructions to provide a capability to communicate over the communication protocol being compatible with the packet.

12. A non-transitory computer readable medium comprising the instructions according to claim 10.

13. The method according to claim 1, comprising the steps of:
   analyzing, with the protocol server, a content of the transmitted packet; and
   determining, with the protocol server, the communication protocol being compatible with the packet based on the analyzed content of the packet.

14. The method according to claim 1, comprising the steps of:
   retrieving, with the protocol server, the executable software instructions based on the communication protocol determined to be compatible with the packet; and
   transmitting, with the protocol server and to the gateway, the retrieved executable software instructions.

15. The method according to claim 1, wherein the executable software instructions are in a form of a plug-in configured for installation on the gateway during run-time.

16. The method according to claim 1, wherein the step of receiving a packet from the building automation device comprises the steps of:
   receiving, with the gateway, the packet as an analog signal from the building automation device; and
   converting, with the gateway, the packet into digital form by demodulating the analog signal and performing analog-to-digital conversion on the demodulated signal;

wherein determining that the gateway currently fails to support a communication protocol being compatible with the packet comprises the step of:

inspecting, with the gateway, the digital form of the packet.

17. The method according to claim 16, comprising the step of:

with the gateway, establishing communication with the building automation device over the communication protocol being compatible with the packet.

18. The method according to claim 1, comprising the step of:

transmitting the packet from the gateway to the protocol server in response to determining that the gateway currently fails to support the communication protocol being compatible with the packet and before the gateway installs the software instructions.

\* \* \* \* \*